April 8, 1941.   S. S. WEST   2,237,643

METHOD OF SUBSURFACE PROSPECTING

Filed Sept. 29, 1936

Inventor
SAMUEL S. WEST
By Jesse R. Stone
& Lister B. Clark
Attorneys

Patented Apr. 8, 1941

2,237,643

UNITED STATES PATENT OFFICE 2,237,643

METHOD OF SUBSURFACE PROSPECTING

Samuel S. West, Houston, Tex., assignor, by mesne assignments, to E. E. Rosaire, Houston, Tex.

Application September 29, 1936, Serial No. 103,129

13 Claims. (Cl. 175—182)

This invention relates to improvements in methods and apparatus for determining electrically the underground structure of the earth. The method and procedure described herein are particularly suitable for the determination of inhomogeneities in the underground strata due to the presence of bodies of relatively high or low conductivity with respect to the portions of the earth surrounding them or for the determination of surfaces of discontinuity, horizontal or inclined, between layers having different conductivities.

The primary object of the invention is to provide means by which an alternating current is caused to flow through the earth and means for detecting and ascertaining the wave form of the potential between two points in the earth subject to the impulses of the earth current.

Another object of the invention is the determination of tectonic structures by their modification of the wave form of an alternating current passing through such structures.

Another object of the invention is the determination of the wave form of the potentials set up by an alternating current flowing in the earth's surface by opposing such potentials with a potential of controllable wave form to obtain a null oscillograph reading.

Other and further objects will be apparent from the following description taken in connection with the drawing, in which.

Figure 1:
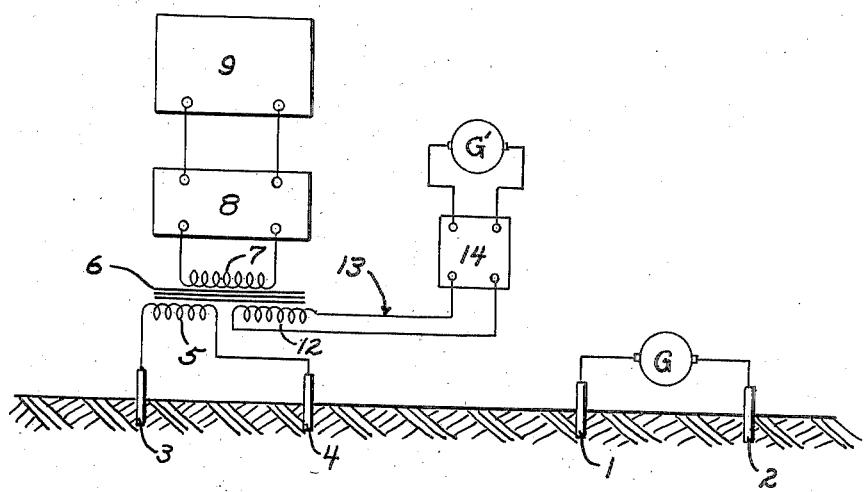
Fig. 1 is a diagrammatic illustration of the apparatus used in the practice of the invention, a profile of the tract under investigation being shown.

Electrodes 1 and 2 are embedded in the ground at suitably spaced points and are connected to a source of alternating current G. The preferred wave form from the source G is rectangular but it is understood that any suitable wave form falls within the contemplation of the invention.

At a distance from the electrodes 1 and 2 are embedded earth electrodes 3—4, hereinafter referred to as potential electrodes. For best results it is preferable that the potential electrodes be embedded in a straight line determined by current electrodes 1 and 2. It is understood, however, that this condition is not a necessity for successful practice of the invention. The potential electrodes are connected to the primary 5 of a transformer 6. The secondary 7 of the transformer is connected to an amplifier 8, which is in turn connected to an attenuator and cathode-ray oscillograph 9 equipped with a repeating sweep circuit. These elements, per se, are well known in the art and are therefore illustrated diagrammatically to clearly disclose the present invention.

To a second primary winding 12 on the transformer 6 is connected a circuit generally designated as 13, which produces an alternating potential by impressing upon a filter system, generally shown at 14, an alternating potential of the same phase, frequency, and wave form as the potential which produces the earth current. This circuit will be referred to as the balancing circuit. The potential produced by the balancing circuit at the secondary of the transformer opposes that produced by the earth current.

Figure 2:
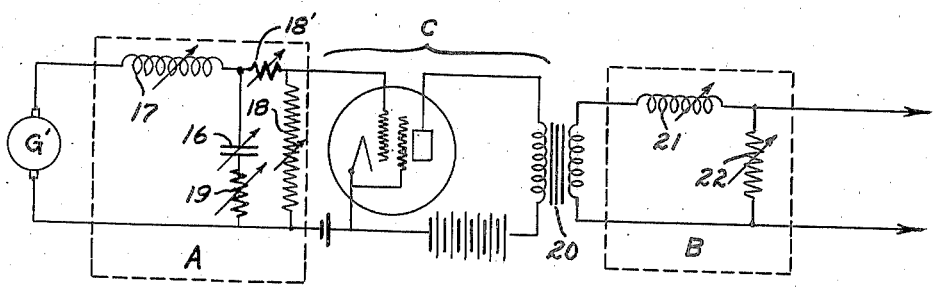
Fig. 2 illustrates a balancing circuit that may be used for determination of the wave form of the potential set up in the earth by flow of alternating current therein.

The filter system 14 which enables control of the wave form of the phantom circuit potential consists of one or more filter units, cascaded or iterated, each containing inductance, capacitance and resistance in some combination. For instance, a good approximation to the wave form of the earth potential can be obtained as shown in Fig. 2 by making one of these units such as A contain inductance, capacitance and resistance and another unit B contain inductance and resistance and connecting them by a unilateral impedance. By unilateral impedance is meant a circuit which will transmit energy in one direction only, such as vacuum tube circuit C, in which energy entering the grid circuit is delivered by the plate circuit, but external energy appearing at the plate circuit is not transmitted back through the tube to the grid circuit.

Filter A comprises a network of capacitance, resistance and inductance. Inductance 17, capacitance 16 and resistance 19 comprise a series circuit which is connected across the terminals of generator G'. In parallel with capacitance 16 and resistance 19 are resistances 18 and 18', the latter of which is connected as shown to act as an impedance in minimizing the effect of the output from 18 on the preceding network. Each of the units of impedance is shown as variable for purposes of illustration but it is understood that any or all may be variable as is well known by those skilled in the art.

The output of the unit A is conducted to unit B through any suitable connection such as the vacuum tube circuit C. It is understood that the unit illustrated is merely illustrative of a number of different forms of the device that may be used for this purpose, the object thereof being to enable such wave form control that opposition thereof to the wave form of the potential between electrodes 3 and 4 will give a small minimum difference on the oscillograph.

Unit B, similar to unit A, is shown as comprising an inductance 21 and resistance 22 which act as a filter for the output from transformer 20, the primary of which is connected to the plate circuit of the unilateral impedance C. With this arrangement it is thus that by use of a suitable selection of inductance, resistance and capacitance, the balancing circuit may be made to produce an electromotive force of any suitable wave form. Numerous other combinations are possible, some of which may give better approximations to the received wave form.

With the generator G supplying an alternating current to the current electrodes 1 and 2 the gain of the amplifier is adjusted so as to make the image of the wave form of the earth potential a suitable size on the cathode-ray screen for easy observation. The sweep circuit of the oscillograph is adjusted to repeat with a frequency the same as that of the generator. The potential from the balancing circuit is adjusted to have a certain selected ratio with the earth potential. The balancing circuit is then connected to the transformer, and its inductance, capacity and resistance values are so adjusted that the cathode-ray-screen image representing the combination of the two potentials has a minimum amplitude. One can adjust for a minimum average amplitude or a zero amplitude at certain selected points of the cycle.

The distance between the current electrodes and the potential electrodes can be varied, while the separation between the electrodes of each pair is kept constant. Thus a third adjustment is added to those of the amplitude and wave form of the balancing circuit potential. Abrupt changes in the circuit constants of the balancing circuit from point to point of a region indicate structural discontinuities in the underground strata, usually of a vertical nature, such as faults.

Abrupt changes in the circuit constants at one point of a region when the distance between the potential and current electrodes is varied continuously indicate structural discontinuities of a horizontal nature, such as bedding plane between two strata of different resistivities.

Distances between electrodes may be from a few hundred feet to a few miles, and the potential difference is less than about 500 volts. A convenient frequency is 60 cycles.

The invention relies upon the fact that the current in the earth flows through a large volume and the individual current elements react upon each other by means of their magnetic fields in such a manner that the effect is that of an inductance between the current electrodes. At the potential electrodes the inductive effect on the wave form depends upon the position of these electrodes with respect to the current electrodes. Discontinuities in the earth change the current paths and hence the wave form representing the potential difference between the potential electrodes.

I am aware that a method has been patented (L. W. Blau, Patent No. 1,911,137; granted May 23, 1933) and is now in use with certain modifications (Louis Statham, "Geophysics," March, 1936) which uses an arrangement of electrodes similar to that described above, together with a cathode-ray oscillograph. This method uses the transient produced in the earth by the sudden application of a direct current at the current electrodes. The modification now in use employs two batteries and switches with two sets of current electrodes placed at different distances from the potential electrodes. By adjusting the two direct currents, the opposing transient potentials can be made to cancel out for large values of time, and by adjusting the position of one potential electrode the combined transient can be made zero at some other definite time after the voltages are simultaneously applied to the two sets of current electrodes.

The present invention, however, differs from that just described both in principle and in certain notable improvements of method. The process is a continuous, not a discontinuous one. Although the method of detection is the same, an alternating current is used instead of a direct current, and the wave form of this alternating current may be any that is desired. Moreover, the use of a balancing circuit containing inductance, capacity, and resistance to balance the alternating potential taken from the earth and thus to determine the underground structure is entirely new in this application. It effects a great saving of time owing to the fact that all adjustments in making one determination can be made by one operator without moving from a central control point or changing the electrode positions. Only four electrodes are necessary at most, and the extent of the electrode system is only a little more than half of the spread for a six-electrode system. All this makes the operation of the apparatus much simpler and less expensive, particularly in regions which have few roads and are covered with underbrush.

It is understood that the means and operative technique illustrated herein may be changed considerably without departure from the spirit of the invention. The invention is therefore claimed broadly and limited only by the prior art and the appended claims.

What is claimed is:

1. The method of determining underground structure which comprises causing an alternating current to flow in the earth, continuously measuring the alternating potential difference between two points subject to the influence of the earth current, comparing said measured potential to another alternating potential whose wave form can be varied at will and altering the wave form of the last mentioned potential until it corresponds to that of the earth potential.

2. The method of determining underground structure which comprises causing an alternating current to flow in the earth, measuring the alternating potential between two points subject to the influence of the earth current and comparing the wave form of the resultant potential difference with that of the alternating potential obtained by passing an alternating current of the same phase, frequency and wave form as the potential causing the earth current, through a circuit in which the wave form may be selectively modified so that by controlling said circuit the latter potential is made to approximate the earth potential at several selected points of a cycle.

3. The method of determining underground structure which comprises causing an alternating current to flow in the earth, measuring the alternating potential between two points subject to the influence of the earth current and comparing the wave form of the resultant potential difference with that of the alternating potential obtained by passing an alternating current of the same phase, frequency and wave form as the potential causing the earth current, through a circuit in which the wave form may be selectively modified so that by controlling said circuit the latter potential is made to approximate the earth potential in an average over a cycle.

4. The method of determining underground structure which comprises causing an alternating current to flow through the earth, impressing on a circuit containing an oscillograph the alternating potential difference between two electrodes embedded in the earth and subject to the influence of the earth current, impressing on said circuit an opposing alternating potential by passing an alternating current, of the same phase, frequency and wave form as the potential causing the earth current through a circuit in which the wave form may be selectively modified and adjusting said circuit until the oscillograph indicates a minimum of the average of the sum of the two alternating potentials.

5. The method of determining underground structure which comprises causing an alternating current to flow through the earth, impressing on a circuit containing an oscillograph the alternating potential difference between two electrodes embedded in the earth and subject to the influence of the earth current, impressing on said circuit an opposing alternating potential by passing an alternating current through a circuit in which the wave form may be selectively modified and adjusting said circuit until the oscillograph indicates a minimum of the average of the sum of the two alternating potentials.

6. The method of determining underground structure which comprises causing an alternating current to flow through the earth, impressing on a circuit containing an oscillograph the alternating potential between two electrodes embedded in the earth and subject to the influence of the earth current, impressing on the circuit containing the oscillograph an opposed alternating potential produced by passing an alternating current through a circuit in which the wave form may be selectively modified, and adjusting said circuit until the oscillograph indicates at certain selected points of the cycle minima of the sum of the two alternating potentials.

7. The method of determining underground structure which comprises causing an alternating current to flow through the earth, impressing on a circuit containing an oscillograph the alternating potential difference between two electrodes embedded in the earth and subject to the influence of the earth current, impressing on said circuit an opposing alternating potential by passing an alternating current of the same phase, frequency and wave form as the potential causing the earth current through a circuit having a controllable time constant, adjusting said circuit until the oscillograph indicates a minimum of the average of the sum of the two alternating potentials and measuring the constants of the adjusted circuit for the respective locations at which observations are taken.

8. The method of determining underground structure which comprises causing an alternating current to flow in the earth, impressing on a circuit containing an oscillograph the alternating potential difference between two electrodes embedded in the earth and subject to the influence of the earth current, impressing on the circuit containing the oscillograph an opposing alternating potential of the same frequency as the potential producing the earth current but of controllable wave form and varying the wave form of the opposing potential to obtain a minimum indication on the oscillograph.

9. Apparatus for determining underground structure comprising in combination means for establishing an electric current in the earth, means for indicating the potential wave form between two points subject to said earth current, and means for impressing on the circuit of said measuring means an opposing alternating potential of controllable wave form whereby a minimum difference of the wave forms may be obtained.

10. Apparatus for determining underground structure comprising means for establishing an alternating electric current in the earth, means for detecting the potential between two points subject to said earth current, means for impressing upon said detecting means an opposing potential of controllable wave form and means for indicating identity of the potential wave forms.

11. Apparatus for determining underground structure comprising means for establishing an alternating electric current in the earth, means for detecting the potential between two points subject to said earth current, means for impressing upon said detecting means an opposing potential of controllable wave form, said means comprising a filter system having a network of variable capacitance, inductance and resistance so that an alternating potential of desired wave form may be made to oppose the wave form of potential between two points subject to the earth current, and means for indicating identity of the potential wave forms.

12. Apparatus for determining underground structure comprising means for establishing an alternating electric current in the earth, means for detecting the potential between two points subject to said earth current, means for impressing upon said detecting means an opposing potential of controllable wave form, said means comprising a plurality of filter units interconnected by unilateral impedances, and means for indicating identity of the potential wave forms.

13. The method of determining underground structure which comprises causing an alternating current to flow in the earth, continuously observing the wave form of the alternating potential difference between two points subject to the influence of the earth current, and simultaneously comparing said observed wave form to that of another alternating potential by varying the latter wave form until there is a predetermined relationship between the wave forms of the two potentials.

SAMUEL S. WEST.